Jan. 12, 1960 H. E. ENGLESON ET AL 2,920,737
ARTICLE BUNCHING AND DETECTING APPARATUS
Filed Oct. 9, 1956 3 Sheets-Sheet 1
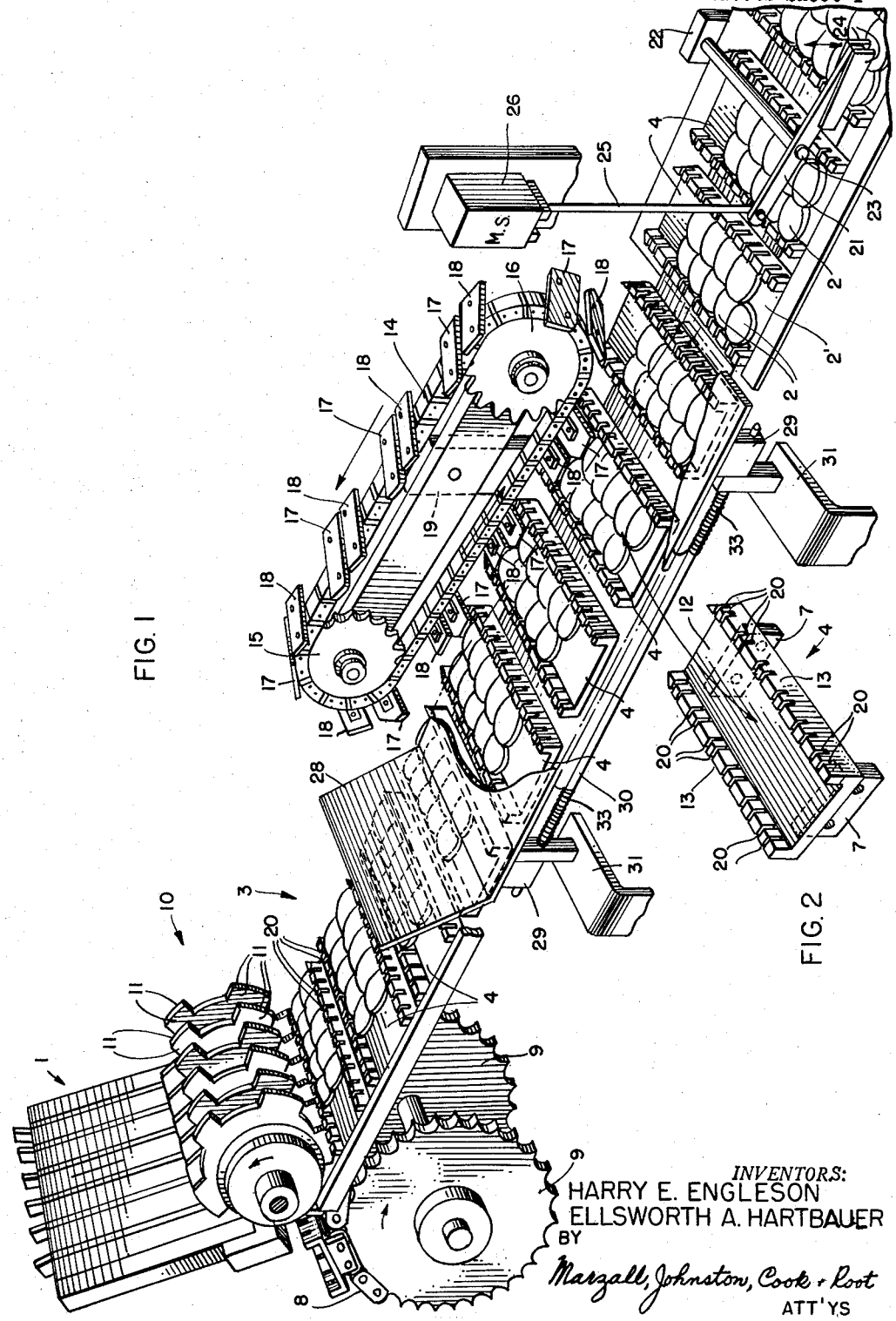
INVENTORS:
HARRY E. ENGLESON
ELLSWORTH A. HARTBAUER
BY
Mazall, Johnston, Cook & Root
ATT'YS

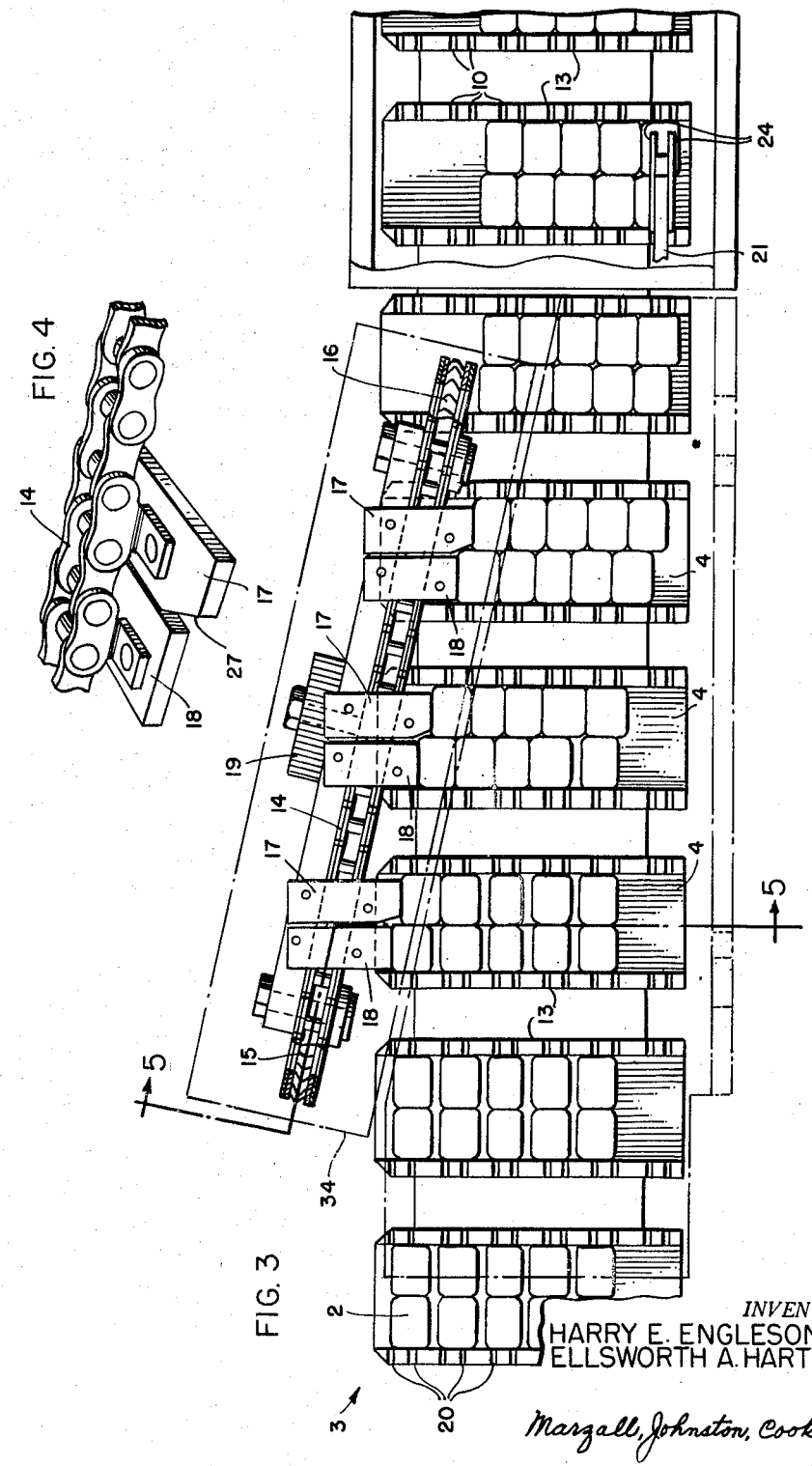

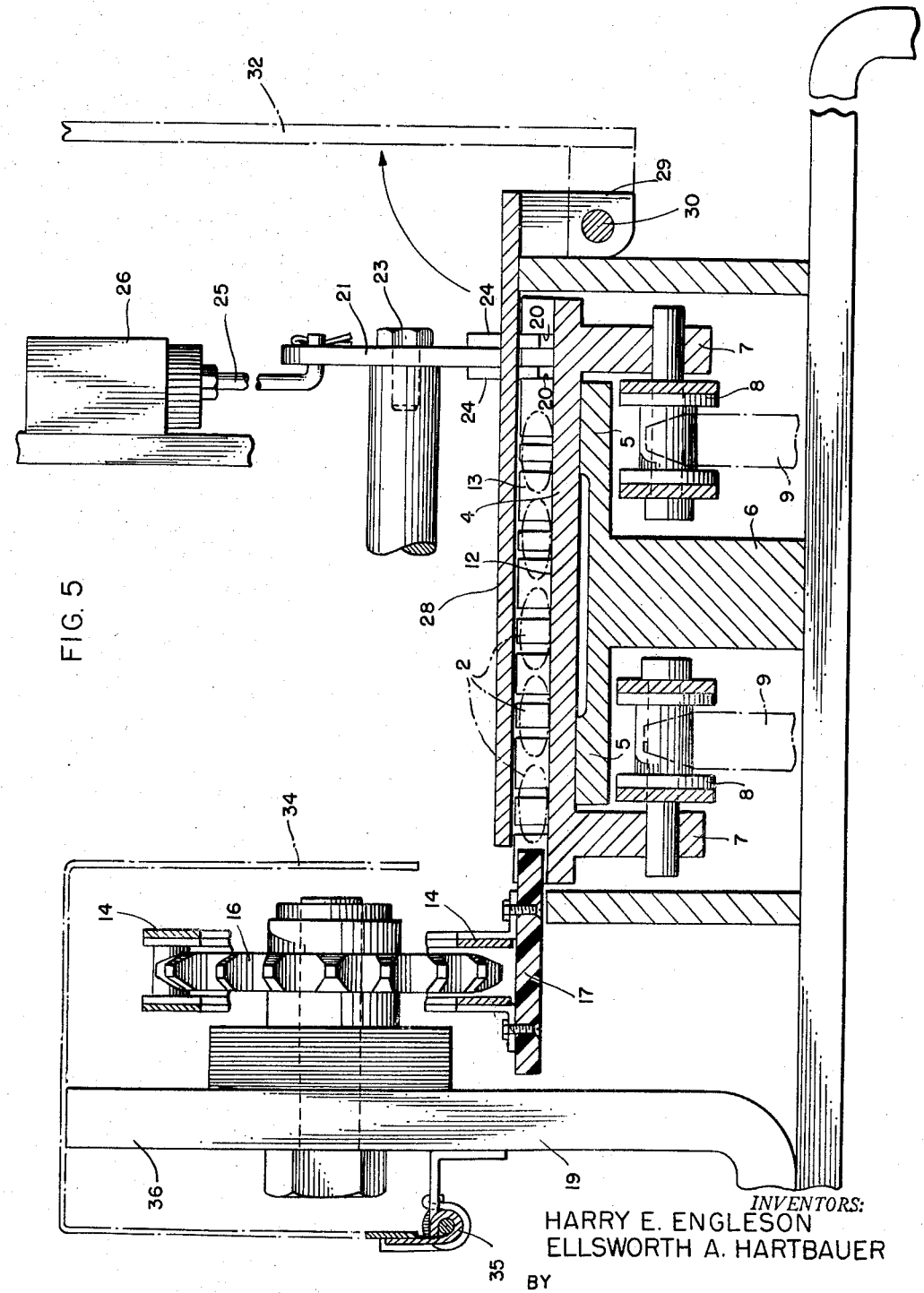

United States Patent Office 2,920,737
Patented Jan. 12, 1960

2,920,737

ARTICLE BUNCHING AND DETECTING APPARATUS

Harry E. Engleson, Chicago, and Ellsworth A. Hartbauer, Des Plaines, Ill., assignors to F. B. Redington Co., Bellwood, Ill., a corporation of Delaware Application October 9, 1956, Serial No. 614,937

4 Claims. (Cl. 198—29)

This invention relates to packaging machinery and, more particularly, to such machinery having a movable conveyor with special pockets or buckets thereon for holding articles in a predetermined configuration.

This invention consists generally of a new and improved arrangement for bunching articles into a close configuration on each of the conveyor buckets, and for mechanically detecting the absence of any article from the configuration.

It is an object of this invention to provide means for bunching the articles and moving them transversely of the conveyor to occupy a space at one end of each bucket thereon, the articles of the bucket being moved by pressure upon the rearmost articles of the configuration, the foremost therefore being moved by pressure applied by the succeeding articles and, therefore, any gaps or vacancies which may have appeared anywhere in the original configuration will thence appear as a gap or vacancy in the foremost row of articles.

A further object of this invention is to provide pusher members attached to and moving with a moving chain positioned diagonally over the conveyor and moving synchronously therewith; the combined movements of the conveyor and the diagonal chain results in the pusher members moving transversely across the conveyor and through each bucket thereon, whereby the articles are bunched in a tight configuration at the foremost end of the bucket.

Another object is to provide an improved method for mechanically detecting a deficiency of articles appearing in a bucket of a movable conveyor and in a rectangular configuration of lines and rows at right angles; the articles may be moved to one end of the bucket by pressure against the rearmost row of the configuration with articles in the more forwardly positioned rows being pushed ahead by the more rearwardly positioned articles whereby any gaps or vacancies in the original configuration will result in a gap in the foremost row which may be detected by a single article sensing arm positioned to engage the articles of the foremost row.

A more complete understanding of the present invention, its mode of operation, and its advantages, may be gathered from further reading of this specification, together with an inspection of the accompanying drawings in which:

Fig. 1 is a perspective view of a portion of the packaging machine particularly illustrating the conveyor, the diagonally positioned chain, and the detector arm, as taught by this invention;

Fig. 2 is a perspective view of a single bucket adapted for use on the conveyor of this invention;

Fig. 3 is a plan view of a portion of the conveyor together with the diagonal bunching chain and the detector arm of this invention;

Fig. 4 is an enlarged fragmentary perspective view of a portion of the diagonal chain with the pusher members attached thereto; and Fig. 5 is a vertical section along the broken line 5—5 of Fig. 3.

The packaging machine particularly illustrated in the drawings is one specific embodiment of the broad teachings of this invention and includes a plurality of inclined chutes 1 for conducting tablets 2 downwardly from a hopper (not shown), a conveyor 3 for carrying the tablets horizontally from the chutes 1, Fig. 1, and further apparatus for transferring the tablets 2 from the conveyor 3 into cardboard cartons (not shown). A plurality of buckets or especially adapted holders 4 are mounted on the conveyor 3 for receiving and carrying the tablets or articles 2. The buckets 4 are slidably mounted upon a pair of stationary rails 5 which are formed integrally with a T-shaped supporting structure 6, Fig. 5. Each bucket 4 contains downwardly extending end lugs 7 adapted for pivotal mounting to the links of a pair of conveyor chains 8. Each chain 8 is supported by and trained about an end sprocket 9.

The inclined chutes 1 terminate at a bucket loading or tablet transfer mechanism 10 which receives two tablets 2 in pairs from each of the chutes and inserts each pair of tablets into a bucket 4, Fig. 1. The inclined chutes 1 are spaced apart and, similarly, the transfer mechanism includes spaced apart disks 11 for depositing the tablets 2 in each bucket 4. The bucket loading mechanism 10 may place any even number of tablets 2 in each bucket 4 up to a maximum of twelve tablets per bucket in the particular machine illustrated. It it is desired to place ten tablets or articles in a bucket, as is illustrated in Fig. 1, one of the chutes 1 may be blocked off and disabled and, thus, the remaining five operative chutes will lay ten tablets 2 in the bucket 4. The tablets 2 will therefore lie in each bucket 4 in a rectangular configuration with two tablets in each row extending longitudinally of the conveyor 3 and between the leading and trailing sides of each bucket, and with five tablets spaced apart in lines extending transveresly of the conveyor 3.

Each bucket includes a flat tray-like surface 12, Fig. 2, the pair of integral downwardly extending end lugs 7 for attachment to the conveyer chains 8 and a pair of upwardly projecting walls 13 forming the leading and trailing sides of the bucket. The bucket is dimensioned to closely contain the two lines of tablets 2 between the walls 13, but may contain five or six rows of tablets 2 arranged loosely or spaced apart from end-to-end extending transversely across the conveyor 3. The rows of tablets, as initially laid into the bucket 4, are loosely spaced and, according to the teachings of this invention, the tablets are bunched into a close configuration for mechanically detecting possible deficiencies in the number of tablets to be packaged.

The bunching apparatus comprises generally a chain 14 trained around a pair of sprockets 15 and 16 and positioned in spaced relation over the conveyor 3. A plurality of pusher members 17 and 18 are arranged in pairs corresponding to the two lines of articles 2 in each bucket and are attached to the chain 14. A fixed bracket 19 holds the sprockets 15 and 16 and the chain 14 thereon in a vertical plane extending diagonally of the conveyer 3. Drive means are provided to rotate the sprocket 16 and move the diagonal chain 14 in synchronism with the motion of the conveyer 3 such that each pair of pusher members 17 and 18, moving diagonally with respect to the conveyer 3, move from a position to the rear of each bucket 4 thereon and progress transversely across the conveyor within the bucket. Thus, the pushers 17 and 18 advance transversely across the conveyor 3 pushing the articles or tablets 2 forwardly in each bucket 4. The sprocket 16 is so positioned relative to the conveyer 3 that the pushers 17 and 18 will move upwardly therearound and will disengage from the tablets, leaving the tablets bunched and forwardly of the conveyer 3 in each bucket 4. Since the pusher members press against the rearmost of the tablets in the bucket and those rearmost tablets, in turn, press against further tablets more forwardly thereof, etc., the tablets thus become bunched together, and any vacancy or gap which may have been in the original configuration of the tablets will subsequently appear as a vacancy or gap in the foremost row of articles, as is shown at 2′, Fig. 1. Since each of the more forwardly positioned tablets are moved by pressure from tablets in the rear thereof, it is obvious that any gap or vacancy in the rear will result in one or more of the foremost tablets dropping or shifting rearwardly in the configuration of tablets to thereby create a gap or vacancy in the foremost row.

The leading and trailing sides 13 of the bucket 4 each have downwardly projecting slots 20 formed therein and uniformly spaced transversely across the conveyer for cooperation with the tablet transfer mechanism 10. A detector arm 21 is mounted on a fixed bracket 22 and may pivot about a shaft 23. A pair of runners 24 are attached to the detector arm 21 and positioned to descend through a foremost pair of the downwardly projecting slots 20 in the walls 13 of the bucket 4. The runners 24 normally ride over the tablets or articles 2 in the foremost row of articles in the bunched configuration within each bucket 4. If a gap appears, as at 2′, the runners 24 will fail to engage an article 2 and will, therefore, descend and pivot the detector arm 21. Movement of the detector arm 21 is transmitted by a push-pull link 25 which, in turn, may function to operate an alarm mechanism such as a microswitch 26.

Although the drawing in Fig. 1 illustrates the manner in which the detector arm 21 may operate a microswitch 26, it will be appreciated that the alarm mechanism may be varied in its structure and function, and the microswitch is purely to illustrate one possible embodiment. In other forms of this invention, the movement of the detector arm may operate a pneumatic valve which, in turn, may disable further apparatus preventing the cartoning of groups of articles of less than the predetermined number for packaging. The ultimate function of the alarm mechanism may be to stop the packaging machine, merely alert an operator to a malfunction of the machine, or the disablement of further packaging apparatus for automatically rejecting a carton which would be filled insufficiently.

The pusher members 17 and 18 are attached to the chain 14 on the bias, or diagonally, to compensate for the diagonal positioning of the chain 14 as it moves with respect to the conveyer 3. Thus, the pusher arm members 17 and 18 will aline themselves parallel with the buckets 4 of the conveyor 3 when suspended from the lower reach of the chain. As the pusher members 17 and 18 move across the upper reach of the chain 14, the bias mounting thereof is of no consequence.

Fig. 4 illustrates particularly the mounting of the pusher members 17 and 18. It will be noted that the trailing corner of the leading pusher member 17 has been cut away at 27. Pusher member 17 is intended to engage only the tablet 2 of the first or leading row of tablets within the buckets 4, and the trailing corner thereof has been cut away to prevent the pushers 17 from inadvertently engaging a tablet from the trailing row, see Fig. 3.

Fig. 3 particularly illustrates the engagement of the pusher members 17 and 18 with the tablets 2 of the conveyor 3. It will be noted that as the tablets are being bunched, the foremost pusher member 17 extends forwardly of the conveyer 3 a greater distance than the rearmost pusher member 18. This accomplishes two desirable results. As the tablets are being bunched, the leading and trailing rows are offset slightly, one with the other, Fig. 3, and therefore there is less likelihood that a tablet from one line may twist into a vacant space or gap which may have inadvertently appeared in the other line. If a tablet were to shift and occupy a position across both lines, that tablet may push forwardly tablets in both rows and prevent the more forward tablets from dropping back and creating a vacancy in the foremost row of tablets, and thus the detector arm 21 would fail to detect a deficiency in the articles. It will be noted that the bunched tablets, to the right of Fig. 3, are nearly in line after disengagement from the pusher members 17 and 18—there being but a slight offset therebetween. This comes about since the leading pusher member 17 moves upwardly around the sprocket 16 and disengages from its tablet somewhat ahead of the rearmost pusher member 18. Thus, the member 18 remains in engagement after the member 17 has disengaged and the transverse movement of the trailing line of tablets 2 continues somewhat longer, ultimately to nearly aline the rows in the configuration.

An overlay plate or cover 28 is positioned over the conveyer 3, Figs. 1 and 5. A pair of end brackets 29 attached to the plate 28 are pivotally mounted at 30 to a pair of stationary brackets 31. The cover may be lifted to the vertical position illustrated by dashed lines at 32 in Fig. 5 to provide access to the conveyer buckets thereunder. Normally, the cover 28 is positioned closely over the conveyer, confining the tablets 2 within the bucket and preventing them from rising or "popping" up particularly when engaged and pushed by the pusher members 17 and 18. The plate 28 may be a piece of transparent Plexiglas or any other suitable material, and is held downwardly partly by its own weight and partly through the urging of a pair of torsion springs 33 positioned about the pivot rod 30.

As illustrated in Fig. 5, a guard 34 may be positioned over the diagonal chain 14 for safety. The guard 34 may be of suitable material such as sheet metal and may be box-like in structure. A hinge mounting 35 may be provided to permit the guard to be tilted rearwardly exposing the chain 14 and the sprockets 15 and 16. An upwardly extending part 36 of the stationary bracket 19 may be positioned to engage the upper portion of the guard 34 whereby the guard is retained in a position protecting the chain 14 and the sprockets 15 and 16.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In a packaging machine having a movable conveyer with a plurality of buckets thereon for holding and carrying articles to be packaged, said buckets movable along a horizontal path, apparatus for bunching the articles at the end of each of the buckets, said apparatus comprising a pair of sprockets rotatable about horizontal axes with a chain trained therearound, said sprockets and chain being positioned diagonally over the conveyer, and a plurality of pusher members attached to and spaced along the diagonal chain, said pusher members movable with the chain and in spaced relation with the conveyer, and operable to push the articles across a part of each bucket transversely of the conveyer.

2. Apparatus according to claim 1 wherein the pusher members are positioned in pairs upon the diagonal chain, each of said pusher members being attached to a link of the chain at a bias angle corresponding to the angle between the diagonal chain and the conveyer, said pusher members being positioned longitudinally of the conveyer buckets and extending transversely of the conveyer.

3. In a packaging machine having a movable conveyer with a plurality of buckets thereon for holding and carrying articles to be packaged, apparatus for bunching the articles at the end of each of the buckets, said apparatus comprising a pair of sprockets with a chain trained therearound, said sprockets and chain being positioned diagonally over the conveyer, and a plurality of pusher members attached to and spaced along the diagonal chain, said pusher members movable with the chain and in spaced relation with the conveyer, and operable to push the articles across a part of each bucket transversely of the conveyer, said pusher members being grouped in pairs along the diagonal chain, each pusher member being attached to a link of the chain and at an angle therewith corresponding to the diagonal positioning of the chain such that the pusher members moving across a bottom reach of the chain are oriented longitudinally of the conveyer buckets, the pusher members of each pair being offset with respect to each other such that the leading pusher member extends forwardly into the conveyer bucket a distance greater than the trailing pusher member whereby the articles are pushed across the bucket in a pair of lines offset with respect to each other.

4. In a packaging machine having a movable conveyer with a plurality of buckets thereon for holding and carrying articles to be packaged, apparatus for bunching the articles at the end of each of the buckets, said apparatus comprising a pair of spaced sprockets rotatable about horizontal axes with a chain trained therearound, said sprockets and chain being positioned diagonally over the conveyer, and stepped pusher means attached to and spaced along the diagonal chain, said pusher means movable with the chain and in spaced relation with the conveyer, and operable to push the articles across a part of each bucket transversely of the conveyer, each pusher means being attached to a link of the chain and at an angle therewith corresponding to the diagonal positioning of the chain such that the pusher means moving across a bottom reach of the chain are oriented longitudinally of the conveyer buckets.

References Cited in the file of this patent

UNITED STATES PATENTS

| | | |
|---|---|---|
| 2,133,248 | Jones | Oct. 11, 1938 |
| 2,285,283 | Jones | June 2, 1942 |
| 2,689,636 | Currivan | Sept. 21, 1954 |
| 2,827,151 | Engleson | Mar. 18, 1958 |